Feb. 12, 1952   E. M. FRYE   2,585,646
SELF-LOCKING COUNTERWEIGHT
Filed May 26, 1950

Inventor:
Enoch M. Frye,
by Russell A. Warner
His Attorney.

Patented Feb. 12, 1952

2,585,646

UNITED STATES PATENT OFFICE 2,585,646

SELF-LOCKING COUNTERWEIGHT

Enoch M. Frye, Melrose, Mass., assignor to General Electric Company, a corporation of New York Application May 26, 1950, Serial No. 164,517

4 Claims. (Cl. 116—136.5)

This invention relates to measuring instruments and, in particular, to the mounting and balancing of the delicate indicating arms of an indicating meter.

The usual indicating meter comprises an armature mounted on a vertical shaft supported in jewel bearings. The vertical shaft, in turn, is passed through a horizontal face plate provided with a calibrated scale. An indicating hand is positioned on the vertical shaft perpendicular thereto to read along the calibrated face plate. This indicating hand must be perfectly balanced in order to provide accurate readings. For the balancing, counterweights of some sort are secured to the indicating hand to balance it in a horizontal plane.

The usual balancing is done after the meter has been assembled, and, since the indicating hand of each meter might have a different balance problem, the counterweight, must be adjustable to compensate for any discrepancy in the indicating hands. In the past, resilient helices, either single or double, have been used as counterweights to balance indicating hands. That is, fine spring wire or the like is wound in the form of a helix and the resilient force of the helix positions the counterweight on the indicating hand. While this has been a satisfactory solution, there has long been a need in the art for an improved self-locking counterweight.

It is an object of this invention to provide an improved self-locking counterweight.

It is a further object of this invention to provide a resilient bushing for positioning an indicating hand on an armature shaft or an instrument.

Further objects and advantages of this invention will become apparent and the invention will be more clearly understood from the following description referring to the accompanying drawing, and the features of novelty which characterize this invention will be pointed out with particularity in the claims annexed to and forming a part of this specification.

Briefly, this invention comprises the use of a metal tube filled with a resilient material, such as neoprene or the equivalent, to provide a self-locking counterweight or indicating hand mounting device.

Figure 1:
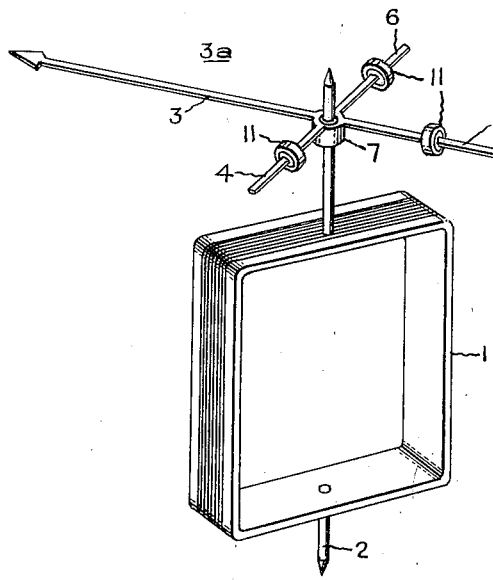
Figure 2:
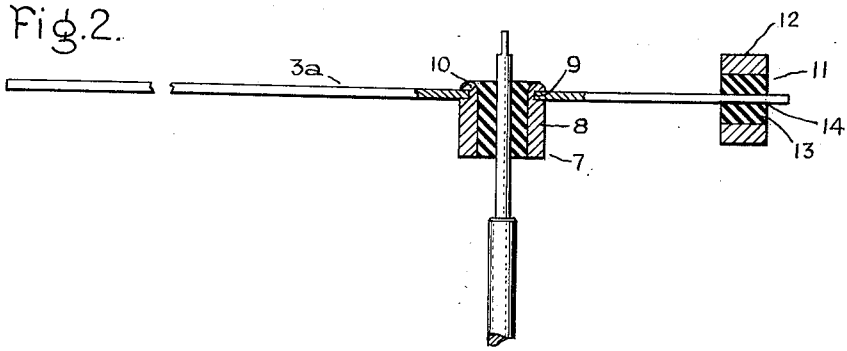

Referring to the drawing, Fig. 1 shows an armature of an indicating meter mounted on a vertical shaft; while Fig. 2 is a side view, partially in section, of the armature shaft and indicating hand.

In the drawing, an armature 1 for an indicating meter is shown mounted on a vertical shaft 2. The vertical shaft is mounted in jewelled bearings (not shown) to provide a minimum of friction. A cross arm 3a is provided with an indicating hand 3 and balance arms 4, 5 and 6. Cross arm 3a is secured to a bushing 7 filled with neoprene or the like. While it is not intended to be a limitation on the scope of this invention, in a preferred embodiment a brass bushing 7 comprises a collar 8 filled with neoprene, which is a trade name for a chlorinated rubber further identified as chlorobutadiene-polymer. Cross arm 3a may be secured to bushing 7 by providing collar 8 with a shoulder or recessed portion 9 and a lip portion 10. Lip portion 10 is bent over cross arm 3a after the cross arm has been placed on shoulder 9. Lip portion 10 could be staked or spun over into engagement with cross arm 3a, or welded to it, or any other suitable securing means may be used, so long as cross arm 3 is rigidly secured to bushing 7.

The advantage of using a neoprene bushing is that the neoprene can absorb any vibration or shock loads that may be imparted by shaft 2 to the cross arm 3a; it allows the plane of cross arm 3a to be adjusted relative to a face plate (not shown); and, in addition, it provides a zero setting mechanism. Specifically, the neoprene exerts a radial gripping force that clamps onto shaft 2; consequently, cross arm 3a can be rotated relative to shaft 2, thereby providing an adjusting device for changing the zero reading of the indicating pointer 3 of the cross arm 3a. Once adjusted, the resilient force of the neoprene will hold the position in which it is placed.

A plurality of bushings 11, each comprising a collar 12 of brass or other material of suitable weight filled with neoprene 13, are provided as balance weights which are positioned on arms 4, 5 and 6 to balance the cross arm 3a about shaft 2. The advantage of using a neoprene filled bushing 11 is that by providing a hole 14 of smaller diameter than the external diameter of the cross arms 4, 5 and 6, then a bushing 11 can be installed over each of the balance arms 4, 5 and 6, and the radial force exerted by the neoprene securely grips the balance arm. With this structure, bushing 11, although tight fitting, can be moved along any one of the balance arms to vary the balance torque about vertical shaft 2. With this improved self-locking counterweight, it has been found that it is a simple matter to balance a cross arm on an armature shaft. The bushings 11 can be cut to any desired length and can be positioned on any of the cross arms at any distance away from vertical shaft 2.

Modifications of this invention will occur to those skilled in the art and it is desired to be understood, therefore, that this invention is not to be limited to the particular embodiment disclosed, but that the appended claims are meant to cover all the modifications which are within the spirit and scope of this invention.

What I claim as new and desire to secure by Letters Patent of the United States is:

1. A balancing weight for instrument cross arms and the like comprising, a cylindrical metal collar filled with neoprene, said neoprene having a central axial opening to provide for tight fitting adjustable installation of said collar on the instrument cross arms.

2. A self-locking collar for use with the indicating needle of a measuring instrument comprising a hollow cylindrical metal shell and a filling of neoprene therefor, said neoprene filling having a central axial bore to provide for a tight fitting adjustable installation of said collar on a shaft or the like passed through said bore.

3. A claim in accordance with claim 2 wherein said collar is an adjustable balancing weight and said axial bore is adapted to engage a cross arm of an instrument.

4. A claim in accordance with claim 2 wherein said collar is a mounting bushing for adjustably positioning the indicating needle on a shaft, said collar having a protruding lip and a shoulder portion at its upper end engageable with the instrument indicating needle, said lip protruding through said needle whereby the lip may be peened over to lock the needle to said mounting bushing.

ENOCH M. FRYE.

REFERENCES CITED

The following references are of record in the file of this patent:

UNITED STATES PATENTS

| Number | Name | Date |
|---|---|---|
| 340,009 | Shepherd | Apr. 13, 1886 |
| 1,155,095 | Porter | Sept. 28, 1915 |
| 1,824,561 | Miller | Sept. 22, 1931 |
| 1,875,848 | Burt | Sept. 6, 1932 |
| 1,883,100 | Terrell | Oct. 18, 1932 |
| 2,429,757 | Hickok | Oct. 28, 1947 |